UNITED STATES PATENT OFFICE 2,524,890

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 26, 1948,
Serial No. 35,526

11 Claims. (Cl. 252—331)

This invention relates to processes or procedures particularly adapted for preventing, breaking or resolving emulsions of the water-in-oil type, and particularly petroleum emulsions. This application is, in part, a continuation of our co-pending application Serial No. 666,824, filed May 2, 1946, now abandoned.

Complementary to the above aspect of our invention is our companion invention concerned with the new chemical products or compounds used as the demulsifying agents in said aforementioned processes or procedures, as well as the application of such chemical compounds, products and the like, in various other arts and industries, along with the method for manufacturing said new chemical products or compounds which are of outstanding value in demulsification. See our co-pending application Serial No. 35,527, filed June 26, 1948, which, in turn, is a continuation of our co-pending application Serial No. 758,491, filed July 1, 1947, now abandoned.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion, in the absence of such precautionary measure. Similarly, such demulsifier may be mixed with the hydrocarbon component. Reference is made to our co-pending applications Serial No. 8,722 and S. N. 8,723, both filed February 16, 1948, now Patents Nos. 2,499,365 and 2,499,366, both dated March 7, 1950.

For the sake of convenience, and in order to indicate with clarity the relationship between the compounds herein employed as demulsifying agents in relation to other compounds employed for the same purpose and described in our last two mentioned co-pending applications, to wit, S. N. 8,722 and 8,723, reference is made to still another of our co-pending applications, to wit, S. N. 8,731, also filed February 16, 1948, now abandoned. In this last mentioned co-pending application we have stated as follows:

"We have found that if solvent-soluble resins are prepared from difunctional (direactive) phenols, in which one of the reactive (o or p) positions of the phenol is substituted by a hydrocarbon radical having 4 to 8 carbon atoms, in the substantial absence of trifunctional phenols, and aldehydes having not over 8 carbon atoms, subsequent oxyalkylation, and specifically oxyethylation, yields products of unusual value for demulsification purposes, provided oxyalkylation is continued to the degree that hydrophile properties are imparted to the compound. By 'substantial absence of trifunctional phenols,' we mean that such materials may be present only in amounts so small that they do not interfere with the formation of a solvent-soluble resin product, and, especially, of a hydrophile oxyalkylated derivative thereof. The actual amounts to be tolerated will, of course, vary with the nature of the other components of the system, but in general, the proportion of trifunctional phenols which is tolerable in the conventional resinification procedures illustrated herein is quite small. In experiments following conventional procedure, using an acid catalyst in which we have included trifunctional phenols in amounts of from 3% to about 1% or somewhat less, based on the difunctional phenols, we have encountered difficulties in preparing oxyalkylated derivatives of the type useful in the practice of this invention.

"Such products are rarely a single chemical compound, but are almost invariably a mixture of cogeners. One useful type of compound may be exemplified in an idealized simplification in the following formula:

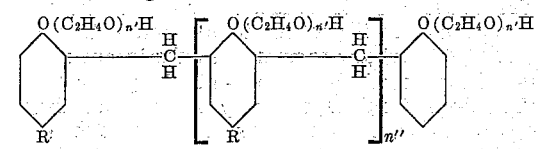

which, in turn, is considered a derivative of the fusible, organic solvent-soluble resin polymer

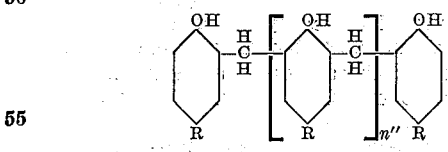

"In these formulae $n''$ represents a numeral varying from 1 to 13, or even more, provided the parent resin is fusible and organic solvent-soluble; $n'$ represents a numeral varying from 1 to 20, with the proviso that the average value of $n'$ be at least 2; and R is a hydrocarbon radical having at least 4 and not over 8 carbon atoms. These numerical values of $n'$ and $n''$ are, of course, on a statistical basis."

The demulsifying agents employed in the present process are similar to those described in our last aforementioned co-pending application, to wit, Serial No. 8,731, and are also obtained from solvent-soluble, fusible, phenol-aldehyde resins. The specific demulsifying agents herein specified are derived from phenols having a long chain meta substituent in combination with difunctional phenols. Thus, in the simplest aspect in which oxyalkylated solvent-soluble, fusible, resins are derived solely from a long chain meta substituent phenol, such as anacardol, dihydroanacardol, tetrahydroanacardol, side chain chlorinated cardanol, etc., the compound may be exemplified in an idealized simplification in the following formula:

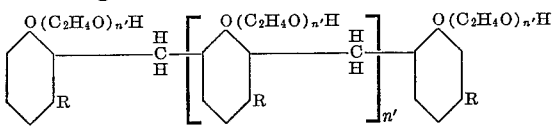

which, in turn, is considered a derivative of the fusible, organic solvent-soluble, resin polymer

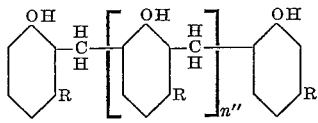

In these formulae $n''$ represents a numeral varying from 1 to 13, or even more, provided the parent resin is fusible and organic solvent-soluble; $n'$ represents a numeral varying from 1 to 20, with the proviso that the average value of $n'$ be at least 2; and R is a hydrocarbon radical or a chlorinated hydrocarbon radical having 15 carbon atoms and derived from cashew nutshell liquid with or without hydrogenation. These numerical values of $n'$ and $n''$ are, of course, on a statistical basis. Bearing in mind that in the instant invention the oxyalkylated resin is derived from a mixture of phenols, it becomes obvious that the structural formula is a mixture between the two limits above indicated, but for practical purposes, may be considered in light of the ultimate type in each case, as described.

The present invention involves the use as a demulsifier of a hydorphile oxyalkylated organic solvent-soluble, fusible, phenol aldehyde resin derived from an aldehyde having not more than 8 carbon atoms and a cashew nutshell liquid or a hydrogenated or chlorinated derivative thereof in combination with difunctional phenols having not cover 24 carbon atoms in the substituent radical. Such oxyalkylated phenolaldehyde resins owe their hydrophile property to the fact that the ratio of oxyalkylated groups to phenolic nuclei is at least 2 to 1, and with the further limitation that the alkylene radicals of the oxyalkylene groups are ethylene, proplene, butylene, butylene, hydroxypropylene, or hydroxybutylene, corresponding to the alphat-beta alkylene oxide, ethylene oxides, alpha-beta propylene oxides, alpha-beta butylene oxides, glycide or methylglycide.

More particularly, the present invention involves the use, as a demulsifier, of a compound having the following characteristics:

(1) Essentially a polymer, probably linear but not necessarily so, having at least 3 and preferably not over 15 or 20 phenolic or structural units. It may have more, as previously noted.

(2) The parent resin polymer being fusible and organic solvent-soluble, as hereinafter described.

(3) The parent resin polymer being free from cross-linking, or structure which cross-links during the heating incident to the oxyalkylation procedure, to an extent sufficient to prevent the possession of hydrophile or sub-surface-active or surface-active properties by the oxyalkylated resin. Minor proportions of trifunctional phenols sometimes present in commercial difunctional phenols are usually harmless.

(4) Each alkyleneoxy group is introduced at the phenolic hydroxyl position, except possibly in an exceptional instance, where a stable methylol group has been formed by virtue of resin manufacture, in presence of an alkaline catalyst. Such occurrence of a stable methylol radical is the exception, rather than the rule, and in any event, apparently does not occur when the resin is manufactured in the presence of an acid catalyst.

(5) The total number of alkyleneoxy radicals introduced must be at least equal to twice the phenolic nuclei.

(6) The number of alkyleneoxy radicals introduced not only must meet the minimum of item (5) above, but also must be sufficient to endow the product with sufficient hydrophile property to have emulsifying properties, or be self-emulsifiable, or self-dispersible, or the equivalent, as hereinafter described. The invention is concerned particularly with the use, as a reactant, of sub-surface-active and surface-active compounds.

(7) The use of a product derived from cashew nutshell liquid with or without hydrogenation so that all or a significant proportion of the phenolic nuclei contain a meta substituted hydrocarbon side chain having 15 carbon atoms.

We have found that the remarkable properties of the parent materials as demulsifiers persist in derivatives which bear a simple genetic relationship to the parent material, and in fact, to the ultimate resin polymer, for instance, in the products obtained by reaction of the oxyalkylated compounds with low molal monocarboxy acids, high molal monocarboxy acids, polycarboxy acids or their anhydrides, alpha-chloro monocarboxy acids, epichlorohydrin, etc. The derivatives also preferably must be obtained from oxyalkylated products showing at least the necessary hydrophile properties per se.

More specifically then, the new compounds herein described and particularly for use as demulsifying agents, are obtained from cashew nutshell liquid, anacardol (3-penta-decadienylphenol), cardanol (dihydroanacardol or 3-pentadecenylphenol), and hydrogenated cardanol (dihydrocardanol or tetrahydroanacardol or 3-penta-decylphenol), in combination with difunctional phenols, as previously specified and illustrated by subsequent examples.

The new compounds or compositions herein described are prepared, in part, from the phenolic compositions present in or derived from the oils extracted from the Anacardium genus of the Anacardiaceae family. Cashew nutshell liqquid is described as consisting of about 90% anacardic acid $C_{22}H_{32}O_3$ and about 10% of cardol, $C_{32}H_{52}O_4$, with very small fractional percentages of other materials. The generally accepted formula of anacardic acid is

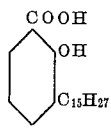

Pyrolytic distillation causes conversion into phenols.

Another derivative of cashew nutshell liquid, in addition to the hydrogenated derivative, is the chlorinated anacardol and chlorinated cardanol. For practical purposes, the principal constituent of chlorinated cashew nutshell liquid is chlorinated cardanol. Chlorination refers to side chain chlorination only, and not to nuclear chlorination. The actual purpose of chlorination is well known and involves the addition of approximately 25% of chlorine, by weight, so as to saturate any ethylene linkage. See U. S. Patent No. 2,399,735, dated May 7, 1946, to Harvey.

These reactive phenolic compounds are combined with suitable aldehydes, including formaldehyde and its isomers, acetaldehyde and higher aldehydes, such as butyraldehyde, heptaldehyde, cyclic aldehydes, such as benzaldehyde, furfural, etc. Resins can be prepared in which part of the treated cashew nutshell liquid or its derivatives, is replaced by another trifunctional phenol, such as ordinary phenol (hydroxybenzene) metacresol, or similar derivatives, in which the ethyl or propyl group appears in the meta position.

As previously stated, these anacardic acid phenols are herein employed in combination with a difunctional phenol, such as ortho cresol, paracresol, para-propylphenol, para-butylphenol, para-amylphenol, para-hexylphenol, para-isooctylphenol, orthophenylphenol, ortho-benzylphenol, para-benzylphenol, para-cyclohexylphenol, phenyl-phenylolmethyl-methane, etc. The effectiveness of the chemical compounds herein contemplated for numerous purposes, appears to be, in a large measure, directly related to the long carbon atom chain of the anacardic acid phenol, and also, in part, to the substituent of the difunctional phenol. As a result, it is necessary only to have one anacardic acid phenol in a polymer interrupted by phenols having other structures. For instance, we have prepared excellent products, in which one mole of cardanol or its equivalent, such as hydrogenated cardanol, has been combined with 2, 3 or 4 moles of orthocresol, tertiary amylphenol, tertiary butylphenol, etc. Similarly, excellent compounds have been prepared in which 5% to 25% of cardanol has been replaced by ordinary phenol or metacresol, particularly if acetaldehyde or higher aldehydes are employed. Similarly, compounds have been prepared involving, for example, 3/4 mole or slightly more of cardanol, 1/4 mole or slightly less of phenol, or metacresol, and 2/3 mole of a difunctional phenol, such as orthocresol, para-cresol, para-butylenphenol, para-amylphenol, etc.

Any aldehyde capable of forming a methylol or a substituted methylol group and having not more than 8 carbon atoms is satisfactory, so long as it does not possess some other functional group or structure which will conflict with the resinification reaction, or with the subsequent oxyalkylation of the resin, but the use of formaldehyde, in its cheapest form of an aqueous solution, for the production of the resins is particularly advantageous. Solid polymers of formaldehyde are more expensive and higher aldehydes are both less reactive, and are more expensive. Furthermore, the higher aldehydes may undergo other reactions which are not desirable, thus introducing difficulties into the resinification step. Thus, acetaldehyde, for example, may undergo an aldol condensation, and it and most of the higher aldehydes enter into self-resinification when treated with strong acids or alkalies. On the other hand, higher aldehydes frequently beneficially affect the solubility and fusibility of a resin. This is illustrated, for example, by the different characteristics of the resin prepared from para-tertiary amylphenol and formaldehyde, on one hand, and a comparable product prepared from the same phenolic reactant and heptaldehyde, on the other hand. The former, as shown in certain subsequent examples, is a hard, brittle solid, whereas, the latter is soft and tacky and obviously easier to handle in the subsequent oxyalkylation procedure.

Cyclic aldehydes may be employed, particularly benzaldehyde. The employment of furfural requires careful control, for the reason that in addition to its aldehydic function, furfural can form vinyl condensations by virtue of its unsaturated structure. The production of resins from furfural for use in preparing products for the present process is most conveniently conducted with weak alkaline catalysts and often with alkali metal carbonates. Useful aldehydes, in addition to formaldehyde, are acetaldehyde, propionic aldehyde, butyraldehyde, 2-ethylhexanol, ethyl-butyraldehyde, heptaldehyde, and benzaldehyde, furfural and glyoxal. It would appear that the use of glyoxal should be avoided, due to the fact that it is tetrafunctional. However, our experience has been that, in resin manufacture and particularly as described herein, apparently only one of the aldehydic functions enters into the resinification reaction. The inability of the other aldehydic function to enter into the reaction is presumably due to steric hindrance. Needless to say, one can use a mixture of two or more aldehydes, although usually this has no advantage.

Resins of the kind which are used as intermediates for the compounds used in the practice of this invention are obtained with the use of acid catalysts or alkaline catalysts, or without the use of any catalyst at all. Among the useful alkaline catalysts are ammonia, amines, and quaternary ammonium bases. It is generally accepted that when ammonia and amines are employed as catalysts, they enter into the condensation reaction, and in fact, may operate by initial combination with the aldehydic reactant. The compound hexamethylenetetramine illustrates such a combination. In light of these various reactions, it becomes difficult to present any formula which would depict the structure of the various resins prior to oxyalkylation. More will be said subsequently as to the difference between the use of alkaline catalyst and an acid catalyst; even in the use of an alkaline catalyst, there is considerable evidence to indicate that the products are not identical where different basic materials are employed. The basic materials employed include not only those previously enumerated but also the hydroxides of the alkali metals, hydroxides of the alkaline earth metals, salts of strong bases and weak acids such as sodium acetate, etc.

As has been pointed out previously, the reasons herein described and used as raw materials are obtained by the use of certain other phenols, in combination with the cashew nutshell liquid phenol. Difunctional phenols having only one carbon atom in the substituent group are limited to ortho and paracresol. Those having 2 to 3 carbon atoms are limited to ortho and para-ethylcresol, and ortho and para-propylphenol. Particularly suitable among the difunctional phenols are those having 4 to 8 carbon atoms in the substituent radical. This particular sub-division of difunctional phenols include para-tertiary butylphenol; para-secondary butylphenol; para-tertiary amylphenol; para-secondary amylphenol; para-tertiary hexylphenol; para-isooctylphenol; orthophenylphenol; para-phenylphenol; ortho-benzylphenol; para-benzylphenol; and para-cyclohexylphenol, and the corresponding ortho-para substituted metacresols and 3,5-xylenols.

Similarly, difunctional phenols having 9 or more carbon atoms in the substituent radical and as many as 24 carbon atoms, include the following: Para-nonylphenol; para-decylphenol; para-dodecylphenol; para-tetradecylphenol; para-octadecylphenol; para-menthylphenol; para-eicosylphenol; para-doeicosylphenol; and para-tetraeicosylphenol. The comparable ortho derivatives or mixtures of the ortho derivatives and para-derivatives may be employed. Trifunctional phenols having no side chains or short side chains are limited to phenol (hydroxybenzene) and metacresol. As far as the difunctional phenols are concerned and to the extent that they are derivatives of hydroxybenzene, it is to be noted that the analogous ortho-para substituted metacresols and 3,5-xylenols may also be employed insofar that they are still difunctional phenols and the methyl group or groups in the meta position are without substantial effect on the property of the resin. Trifunctional phenols exclude any having 4 carbon atoms or more in the meta position substituent.

It has been pointed out previously that the resins employed as raw materials in the manufacture of the herein described compounds are obtained from anacardic acid phenols alone, or in combination with difunctional phenols or trifunctional phenols, or both. No description of trifunctional phenols is needed and as to difunctional phenols, reference is made to the language used in our aforementioned copending applications, Serial No. 8,722 and 8,723, both filed February 16, 1948. As to anacardic acid phenols, as herein described, one may conveniently employ the formula

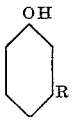

in which R represents a hydrocarbon radical or a chlorinated hydrocarbon radical, as exemplified by cashew nutshell liquid phenol, or its hydrogenated or chlorinated derivative.

The manufacture of organic solvent-soluble, thermoplastic phenol-aldehyde resins is concerned largely with the manufacture of (a) Resoles or Novolaks from trifunctional phenols;

(b) Manufacture of varnish resins from difunctional phenols; and (c) The manufacture of the cardanol type resin from phenols or phenolic mixtures, as previously specified.

There is an ample description in the literature as to the manufacture of resins from cardanol type phenols alone and in combination with other phenols. Any suitable process may be employed to make the herein described resins which are used as raw materials. We have found it most convenient to use the same general procedures which are applicable to the manufacture of resins from difunctional phenols, particularly in which the substituent radical has 4 to 8 carbon atoms. This procedure is described, for example, in the literature and specific examples included in our aforementioned co-pending application Serial No. 8,731, filed February 16, 1948.

Thermoplastic or fusible phenol-aldehyde resins are usually manufactured for the varnish trade, and oil-solubility is of prime importance. For this reason, the common reactants employed are butylated phenols, amylated phenols, phenylphenols, etc. The methods employed in manufacturing such resins are similar to those employed in the manufacture of ordinary phenol-formaldehyde resins, in that either an acid or alkaline catalyst is usually employed. The procedure usually differs from that employed in the manufacture of ordinary phenol-aldehyde resins, in that phenol, being water-soluble, reacts readily with an aqueous aldehyde solution without further difficulty, while when a water-insoluble phenol is employed, some modification is usually adopted to increase the interfacial surface, and thus cause reaction to take place. A common solvent is sometimes employed. Another procedure employs rather severe agitation to create a large interfacial area. Once the reaction starts to a moderate degree, it is possible that both reactants are somewhat soluble in the partially reacted mass and assist in hastening the reaction. We have found it desirable to employ a small proportion of an organic sulfo-acid as a catalyst, either alone or along with a mineral acid like sulfuric or hydrochloric acid. For example, alkylated aromatic sulfonic acids are effectively employed. Since commercial forms of such acids are commonly their alkali salts, it is sometimes convenient to use a small quantity of such alkali salt, plus a small quantity of strong mineral acid, as shown in the examples below. If desired, such organic sulfo-acids may be prepared in situ in the phenol employed, by reacting concentrated sulfuric acid with a small proportion of the phenol. In such cases where xylene is used as a solvent and concentrated sulfuric acid is employed, some sulfonation of the xylene probably occurs to produce the sulfo-acid. Addition of a solvent such as xylene is advantageous, as hereinafter described in detail. Another variation of procedure is to employ such organic sulfo-acids, in the form of their salts, in connection with an alkali-catalyzed resinification procedure. Detailed examples are included subsequently.

Sometimes conventional resinification procedure is employed, using either acid or alkaline catalysts to produce low-stage resins. Such resins may be employed as such, or may be altered or converted into high-stage resins, or in any event, into resins of higher molecular weight, by heating along with the employment of vacuum, so as to split off water or formaldehyde, or both. Generally speaking, temperatures employed, particularly with vacuum, may be in the neighborhood of 175° to 250° C., or thereabouts.

In the hereto appended claims there is specified, among other things, the resin polymer containing at least 3 phenolic nuclei. Such minimum molecular size is most conveniently determined, as a rule, by cryoscopic method, using benzene, or some other suitable solvent for such resins. As a matter of fact, using the procedures herein described or any conventional resinification procedure, will yield products usually having definitely in excess of three nuclei. In other words, a resin having an average of 4, 5 or 5½ nuclei per unit is apt to be formed as a minimum in resinification, except under certain special conditions where dimerization may occur.

However, if resins are prepared at substantially higher temperatures, substituting cymene, tetralin, etc., or some other suitable solvent which boils or refluxes at a higher temperature, instead of xylene, in subsequent examples, and if one doubles or triples the amount of catalyst, doubles or triples the time of refluxing, uses a marked excess of formaldehyde or other aldehyde, then the average size of the resin is apt to be distinctly over the above values, for example, it may average 7 to 15 units. Sometimes the expression "low-stage" resin or "low-stage" intermediate is employed to mean a stage having 6 or 7 units or even less. In the appended claims we have used "low-stage" to mean 3 to 7 units based on average molecular weight.

The molecular weight determinations, of course, require that the product be completely soluble in the particular solvent selected as, for instance, benzene. The molecular weight determination of such solution may involve either the freezing point as in the cryoscopic method, or, less conveniently perhaps, the boiling point in an ebullioscopic method. The advantage of the ebullioscopic method is that, in comparison with the cryoscopic method, it is more apt to insure complete solubility. One such common method to employ is that of Menzies and Wright (see J. Am. Chem. Soc. 43, 2309 and 2314 (1921)). Any suitable method for determining molecular weights will serve, although almost any procedure adopted has inherent limitations. A good method for determining the molecular weights of resins, especially solvent-soluble resins, is the cryoscopic procedure of Krumbhaar which employs diphenylamine as a solvent (see "Coating and Ink Resins," page 157, Reinhold Publishing Co., 1947).

Subsequent examples will illustrate the use of an acid catalyst, an alkaline catalyst, and no catalyst. As far as resin manufacture per se is concerned, we prefer to use an acid catalyst, and particularly a mixture of an organic sulfoacid and a mineral acid, along with a suitable solvent, such as xylene, as hereinafter illustrated in detail. However, we have obtained products from resins obtained by use of an alkaline catalyst which were just as satisfactory as those obtained employing acid catalysts. Sometimes a combination of both types of catalysts is used in different stages of resinification. Resins so obtained are also perfectly satisfactory.

In numerous instances the higher molecular weight resins, i. e., those referred to as high-stage resins, are conveniently obtained by subjecting lower molecular weight resins to vacuum distillation and heating. Although such procedure sometimes removes only a modest amount or even perhaps no low polymer, yet it is almost certain to produce further polymerization. For instance, acid catalyzed resins obtained in the usual manner and having a molecular weight indicating the presence of approximately 4 phenolic units or thereabouts may be subjected to such treatment, with the result that one obtains a resin having approximately double this molecular weight. The usual procedure is to use a secondary step, heating the resin in the presence or absence of an inert gas, including steam, or by use of vacuum.

We have found that under the usual conditions of resinification employing phenols of the kind here described, there is little or no tendency to form binuclear compounds, i. e., dimers, resulting from the combination, for example, of 2 moles of a phenol and one mole of formaldehyde, particularly where the substituent has 4 or 5 carbon atoms. Where the number of carbon atoms in a substituent approximates the upper limit specified herein, for instance 7 or 8, there may be some tendency to dimerization. The usual procedure to obtain a dimer involves an enormously large excess of the phenol, for instance, 8 to 10 moles per mole of aldehyde. Substituted dihydroxydiphenyl-methanes obtained from substituted phenols are not resins as that term is used herein.

Although any conventional procedure ordinarily employed may be used in the manufacture of the herein contemplated resins or, for that matter, such resins may be purchased in the open market, we have found it particularly desirable to use the procedures described elsewhere herein, and employing a combination of an organic sulfo-acid and a mineral acid as a catalyst, and xylene as a solvent. By way of illustration, certain subsequent examples are included, but it is to be understood the herein described invention is not concerned with the resins per se or with any particular method of manufacture but is concerned with the use of derivatives obtained by the subsequent oxyalkylation thereof. The phenol-aldehyde resins may be prepared in any suitable manner.

Oxyalkylation, particularly oxyethylation which is the preferred reaction, depends on contact between a non-gaseous phase and a gaseous phase. It can, for example, be carried out by melting the thermoplastic resin and subjecting it to treatment with ethylene oxide or the like, or by treating a suitable solution or suspension. Since the melting points of the resins are often higher than desired in the initial stage of oxyethylation, we have found it advantageous to use a solution or suspension of thermoplastic resin in an inert solvent such as xylene. Under such circumstances, the resin obtained in the usual manner is dissolved by heating in xylene under a reflux condenser or in any other suitable manner. Since xylene or an equivalent inert solvent is present or may be present during oxyalkylation, it is obvious there is no objection to having a solvent present during the resinifying stage if, in addition to being inert towards the resin, it is also inert towards the reactants and also inert towards water. Numerous solvents, particularly of aromatic or cyclic nature, are suitably adapted for such use. Examples of such solvents are xylene, cymene, ethyl benzene, propyl benzene, mesitylene, decalin (decahydronaphthalene), tetralin (tetrahydronaphthalene), ethylene glycol diethylether, diethylene glycol diethylether, and tetraethylene glycol dimethylether, or mixtures of one or more. Solvents such as dichloroethylether, or dichloropropylether may be employed either alone or in mixture but have the objection that the chlorine atom in the compound may slowly combine with the alkaline catalyst employed in oxyethylation. Suitable solvents may be selected from this group for molecular weight determinations.

The use of such solvents is a convenient expedient in the manufacture of the thermoplastic resins, particularly since the solvent gives a more liquid reaction mass and thus prevents overheating, and also because the solvent can be employed in connection with a reflux condenser and a water trap to assist in the removal of water of reaction and also water present as part of the formaldehyde reactant when an aqueous solution of formaldehyde is used. Such aqueous solution, of course, with the ordinary product of commerce containing about 37½% to 40% formaldehyde, is the preferred reactant. When such solvent is used, it is advantageously added at the beginning of the resinification procedure, or before the reaction has proceeded very far.

The solvent can be removed afterwards by distillation, with or without the use of vacuum, and a final higher temperature can be employed to complete reaction, if desired. In many instances, it is most desirable to permit part of the solvent, particularly when it is inexpensive, e. g., xylene, to remain behind in a predetermined amount so as to have a resin which can be handled more conveniently in the oxyalkylation stage. If a more expensive solvent, such as decalin, is employed, xylene or other inexpensive solvent may be added after the removal of decalin, if desired.

Reference has been made to the word "fusible." Ordinarily, a thermoplastic resin is identified as one which can be heated repeatedly and still not lose its thermoplasticity. It is recognized, however, that one may have a resin which is initially thermoplastic, but on repeated heating, may become insoluble in an organic solvent, or at least, no longer thermoplastic, due to the fact that certain changes take place very slowly. As far as the present invention is concerned, it is obvious that a resin, to be suitable, need only be sufficiently fusible to permit processing to produce our oxyalkylated products and not yield insolubles or cause insolubilization or gel formation, or rubberiness, as previously described. Thus, resins which are, strictly speaking, fusible but not necessarily thermoplastic in the most rigid sense that such terminology would be applied to the mechanical properties of a resin, are useful intermediates. The bulk of all fusible resins of the kind herein described are thermoplastic.

The fusible or thermoplastic resins, or solvent-soluble resins, herein employed as reactants, are water-insoluble, or have no appreciable hydrophile properties. The hydrophile property is introduced by oxyalkylation. In the hereto appended claims and elsewhere the expression "water-insoluble" is used to point out this characteristic of the resins used.

Previous reference has been made to organic solvent-soluble resins, such as novolaks or resoles of the kind obtained exclusively from difunctional phenols. The present invention involves at least three types of resins which have been specified in detail. All these may be considered as members of the broad generic class of organic solvent-soluble fusible phenol-aldehyde resins contemplated in our two aforementioned co-pending applications Serial Nos. 8,722 and 8,723. In all such instances, the resin consists of discrete or separate molecules, as differentiated from a completely cross-linked resin. Fusibility and solubility in an organic solvent are characteristic of this state of sub-division.

EXAMPLE 1a

|  | Grams |
|---|---|
| Cardanol (vacuum distilled) | 576 |
| Para-cresol | 108 |
| Formaldehyde (37%) | 240 |
| Concentrated HCl | 4.5 |
| Xylene | 250 |
| Monoalkyl $C_{10}$–$C_{20}$, principally $C_{12}$–$C_{14}$) benzene monosulfonic acid sodium salt | 3 |

(Examples of alkylaryl sulfonic acids which serve as catalysts and as emulsifiers particularly in the form of sodium salts include the following:

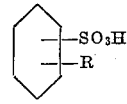

R is an alkyl hydrocarbon radical having 12–14 carbon atoms.

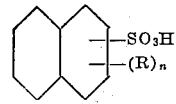

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, we have employed a monoalkylated benzene monosulfonic acid or the sodium salt thereof, wherein the alkyl group contains 10 to 14 carbon atoms. We have found equally effective and inter-changeable the following specific sulfonic acids or their sodium salts: A mixture of di- and tripropylated naphthalene monosulfonic acid; diamylated naphthalene monosulfonic acid; and nonyl naphthalene monosulfonic acid.)

The equipment used was a conventional two-piece laboratory resin pot. The cover part of the equipment had four openings: one for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending upon the position of the three-way stop-cock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The phenol-formaldehyde acid catalyst (acid and sulfonate salt in combination) and solvent were combined in the resin pot described. This particular resin was a reddish-black liquid, having a viscosity comparable to that of ordinary oil or slightly in excess thereof. Heat was applied with gentle stirring and the temperature was raised to 80°–85° C., at which point a mild exothermic reaction took place. This reaction raised the temperature to approximately 105°–110° C. The reaction mixture was then permitted to reflux at 100°–105° C. for approximately three and a half hours. The reflux trap arrangement was then changed from the reflux position to the normal water entrapment position. The water of solution and the water of reaction were permitted to distil out and collect in the trap. As the water distilled out, the temperature gradually increased to approximately 130° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have also removed the solvent by means of vacuum (approximately 25 mm. Hg.) using a temperature of 160° C. The final product was a soft, pliable resin which was xylene-soluble.

EXAMPLE 2a

| | Grams |
|---|---|
| Cardanol | 576 |
| Para-cresol | 108 |
| Formaldehyde (37%) | 240 |
| Ammonia (26° Baumé) | 27.5 |

All of the above materials were refluxed together for 6 hours, followed by removal of water by distillation, heated to 125° C. and held at this temperature for approximately 4 hours until a hard, brittle resin was obtained. The resin so obtained was thermoplastic and soluble in xylene.

EXAMPLE 3a

| | Grams |
|---|---|
| Cardanol | 357.6 |
| Ortho or para-cresol | 89.4 |
| Concentrated sulfuric acid | 5.0 |
| Acetaldehyde | 78 |
| Xylene | 200 |

The phenol, acid catalyst, and 50 grams of xylene were combined in the resin pot previously described under Example 1a. The initial mixture did not include the aldehyde. The mixture was heated, with stirring, to approximately 150° C. and permitted to reflux.

The remainder of the xylene—150 grams—was then mixed with the acetaldehyde, and this mixture was added slowly to the materials in the resin pot, with constant stirring, by means of the separatory funnel arrangement previously mentioned in the description of the resin pot in Example 1a. Approximately 30 minutes were required to add this amount of diluted aldehyde. A mild exothermic reaction was noted at the first addition of the aldehyde. The temperature slowly dropped, as water of reaction formed, to about 100° to 110° C., with the reflux temperature being determined by the boiling point of water. After all the aldehyde had been added, the reactions were permitted to reflux for between an hour to an hour and a half before removing the water by means of the trap arrangement. After the water was removed the remainder of the procedure was essentially the same as in Example 1a. The solvent-free resin was soft, almost fluid, and xylene-soluble.

EXAMPLE 4a

The same procedure was followed as in Example 3a, except that the amount of cardanol employed was reduced to 268.2 grams and the amount of cresol was increased to 178.8 grams.

EXAMPLE 5a

The same procedure was followed as in Example 3a, except that the amount of cardanol employed was reduced to 137.3 grams and the amount of cresol increased to 268 grams.

EXAMPLE 6a

The same procedure was followed as in Example 3a, except that para-ethylphenol, para-propylphenol, para-butylphenol, para-amylphenol, or para-octylphenol was substituted in molar equivalent amounts for the ortho or para-cresol.

EXAMPLE 7a

The same procedure was followed as in the preceding six examples, except that 78 grams of acetaldehyde were replaced by a molar equivalent of heptaldehyde.

EXAMPLE 8a

The same procedure was followed as in Examples 3a to 5a, except that the 78 grams of acetaldehyde were replaced by a molar equivalent of heptaldehyde.

EXAMPLE 9a

| | Grams |
|---|---|
| Cardanol | 115.2 |
| Para-ethylphenol | 12.2 |
| Formaldehyde (37%) | 40 |
| Concentrated HCl | .8 |
| Monoalkyl ($C_{10}$–$C_{20}$, principally $C_{12}$–$C_{14}$) benzene monosulfonic acid sodium salt | .5 |
| Xylene | 75 |

The molar ration was 4 of cardanol to 1 of para-ethylphenol. The procedure followed was the same as that in Example 1a.

EXAMPLE 10a

The same procedure was followed as in the preceding example, except that the para-ethylphenol was replaced by the molar equivalent amount of orthocresol, para-butylphenol, para-octylphenol, para-amylphenol, para-phenylphenol, or other difunctional phenol. In the corresponding example referred to in the subsequent table giving oxyethylation procedure, the specific phenol employed was para-secondary butylphenol.

EXAMPLE 11a

The same procedure was followed as in Example 9a and Example 10a, except that the molar ratio of cardanol to difunctional phenol was changed from 4 to 1 to 3 to 2 with the molar proportion of total phenol the same. Otherwise, the same reactants and the same procedure were employed. In the corresponding example referred to in the subsequent table giving oxyethylation procedure, the specific phenol employed was para-secondary butylphenol.

EXAMPLE 12a

Examples 1a to 11a were repeated, replacing cardanol by hydrogenated cardanol. Since the commercial products are not one hundred percent pure, it was not necessary to make any change in the formulations, because of the slight difference in molecular weight between hydrogenated cardanol and cardanol. However, allowance for this slight difference can be made.

EXAMPLE 13a

| | Grams |
|---|---|
| Chlorinated cardanol | 171 |
| Para-tertiary amylphenol | 82 |
| Butyraldehyde | 72 |
| Concentrated sulfuric acid | 2.5 |
| Xylene | 250 |

The procedure employed was essentially the same as in Example 3a, where acetaldehyde was employed, but with the difference that, due to the fact that the particular aldehyde was a higher boiling aldehyde, it was not necessary to dilute it with xylene, although this procedure may be employed, if desired. For this reason, we added all the xylene to the initial mixture and the higher boiling aldehyde was added by means of the separatory funnel arrangement; thus, the phenol, acid catalyst and solvent combined in the resin pot by the same procedure used as in Example 3a. The solvent-free resin was black, and soft to semi-fluid in consistency. The solution, as prepared, contained 44.8% xylene.

EXAMPLE 14a

| | Grams |
|---|---|
| Cardanol (vacuum distilled) | 288 |
| Nonylphenol | 220 |
| Butyraldehyde | 144 |
| Concentrated sulfuric acid | 5 |
| Xylene | 250 |

The procedure followed was the same as described under the heading of Example 4a, preceding. The solvent-free resin was reddish-black in color and soft to semi-fluid in consistency. The solution, as prepared, contained 29.4% xylene.

EXAMPLE 15a

| | Grams |
|---|---|
| Cardanol (vacuum distilled) | 288 |
| Menthylphenol | 232 |
| Heptaldehyde | 228 |
| Concentrated sulfuric acid | 8 |
| Xylene | 350 |

The procedure followed was the same as described under the heading of Example 13a, preceding. The solvent-free resin was reddish-black in color and soft to semi-fluid in consistency.

EXAMPLE 16a

| | Grams |
|---|---|
| Cardanol (vacuum distilled) | 288 |
| Para-decylphenol | 232 |
| Concentrated sulfuric acid | 5 |
| Butyraldehyde | 144 |
| Xylene | 250 |

The procedure followed was the same as described under the heading of Example 13a, preceding. The resultant solvent-free resin was semi-fluid and dark red in appearance.

EXAMPLE 17a

| | Grams |
|---|---|
| Cardanol (vacuum distilled) | 288 |
| Nonylphenol | 220 |
| Benzaldehyde | 212 |
| Concentrated sulfuric acid | 4 |
| Xylene | 300 |

The procedure followed was the same as described under Example 13a, preceding. The resultant resin was dark red in color, and viscous in consistency.

EXAMPLE 18a

| | Grams |
|---|---|
| Cardanol (vacuum distilled) | 288 |
| Nonylphenol | 220 |
| Furfural | 192 |
| Potassium carbonate | 12 |

The furfural was shaken with dry sodium carbonate prior to use, to eliminate any acids, etc. The procedure employed was substantially that described in detail in Technical Bulletin No. 109 of the Quaker Oats Co., Chicago, Illinois. The above reactants were heated under the reflux condenser for 2 hours in the same resin pot arrangement described in Example 1a. The separatory funnel device was not employed. No xylene or other solvent was added at this stage. The amount of material vaporized and condensed was comparatively small, except for the water of reaction. At the end of this heating or reflux period the trap was set to remove the water. The maximum temperature during and after removal of water was approximately 202° C. The material in the trap represented 33 cc. water and 2.5 cc. furfural. At this point 250 grams of xylene were added so as to give a suitable solution. The resin was reddish-black in color, xylene-soluble and semi-soft or tacky in consistency. The solution, as prepared, contained approximately 25% xylene.

EXAMPLE 19a

| | Grams |
|---|---|
| Cardanol (vacuum distilled) | 288 |
| Nonylphenol | 220 |
| Formaldehyde (37%) | 176 |
| Water | 34 |
| Xylene | 226 |
| Sodium hydroxide | 7.9 |

The above reactants were combined in a resin pot similar to that previously described, equipped with stirrer and reflux condenser. The reactants were heated, with stirring, under reflux for 2 hours at 100° to 110° C. The resinous mixture was then permitted to cool sufficiently to permit the addition of 15 ml. of glacial acetic acid in 150 cc. water. On standing, a separation was effected, and the aqueous lower layer drawn off. The upper resinous solution was then washed with 300 ml. of water to remove any excess HCHO, sodium acetate, or acetic acid. The xylene solution was heated under a condenser at 150° C. for 30 minutes. Since subsequent experimentation showed that removal of this xylene at this particular temperature employing vacuum tended to cause the product to become rubbery, the procedure employed was to permit the xylene to remain and add enough additional xylene so the final resin solution represented 50%, by weight, of resin. The amount of xylene required was 300 grams.

EXAMPLE 20a

| | Grams |
|---|---|
| Cardanol (vacuum distilled) | 288 |
| Nonylphenol | 220 |
| Formaldehyde (37%) | 178 |
| Xylene | 300 |
| Catalyst | None |

The same procedure was followed as in Example 15a, preceding. Reaction was conducted in a stirring autoclave for 4½ hours at a temperature of 160° C. and 145 pounds gauge pressure. When resinification was complete, 100 grams of xylene were added and stirred, using the same temperature and pressure for approximately one hour to obtain complete solution or suspension. The resin was dispersible in xylene, but not clearly soluble. It was clearly soluble, however, in diethyleneglycol diethylether. The solvent-free resin was reddish-amber in color and semi-pliable to rubbery in consistency.

EXAMPLE 21a

| | Grams |
|---|---|
| Cardanol (vacuum distilled) | 288 |
| Para-decylphenol | 232 |
| Formaldehyde (37%) | 178 |
| Concentrated HCl | 3.5 |
| Xylene | 300 |
| Monoalkyl ($C_{10}$–$C_{20}$, principally $C_{12}$–$C_{14}$) benzene monosulfonic acid sodium salt | 1.8 |

The procedure followed was the same as described in the preceding Example 1a. The resin obtained was reddish-amber in color and semi-fluid in consistency.

EXAMPLE 22a

A resin was prepared in the manner described under Example 15a, preceding. Such resin was subjected to vacuum distillation in the following manner: It was stripped of xylene by heating to a temperature of 200° C. at a vacuum of 25 mm. (Hg). The resin obtained was reddish-black in color and extremely tacky and semi-pliable. It was definitely more viscous or more nearly like a solid in consistency than the parent resin which had not been subjected to distillation. The resin was, of course, xylene-soluble.

EXAMPLE 23a

|  | Grams |
|---|---|
| Cardanol (vacuum distilled) | 288 |
| Menthylphenol | 232 |
| Acetaldehyde | 88 |
| Concentrated sulfuric acid | 5 |
| Xylene | 100 |

The procedure followed was the same as described under the heading of Example 3a, preceding. The resin obtained was dark red, and soft to semi-tacky in consistency.

EXAMPLE 24a

|  | Grams |
|---|---|
| Cardanol (vacuum distilled) | 288 |
| Menthylphenol | 232 |
| Butyraldehyde | 144 |
| Concentrated sulfuric acid | 5 |
| Xylene | 100 |

The procedure followed was the same as described under the heading of Example 13a, preceding. The resin was dark red in color and soft to fluid in consistency. The final solution contained 13.5% xylene.

EXAMPLE 25a

|  | Grams |
|---|---|
| Cardanol (vacuum distilled) | 230 |
| Para-phenylphenol | 34 |
| Formaldehyde | 80 |
| Concentrated HCl | 1 |
| Monoalkyl ($C_{10}$–$C_{20}$, principally $C_{12}$–$C_{14}$) benzene monosulfonic acid sodium salt | 1 |
| Xylene | 150 |

The procedure followed was the same as described in Example 1a, preceding. The solvent-free resin was semi-solid and somewhat pliable, but was dispersible in xylene, but not completely soluble. The solution, as prepared, contained 35% xylene.

EXAMPLE 26a

|  | Grams |
|---|---|
| Hydrogenated Cardanol | 144 |
| Amylphenol | 164 |
| Formaldehyde (37%) | 120 |
| Concentrated HCl | 2.5 |
| Monoalkyl ($C_{10}$–$C_{20}$, principally $C_{12}$–$C_{14}$) benzene monosulfonic acid sodium salt | 1.5 |
| Xylene | 250 |

The procedure followed was that described in Example 1a, preceding. The resin obtained was a hard, brittle product, xylene-soluble. The solvent-free resin had a melting point of 105° C. The resin, as prepared, contained 43% xylene.

As far as the manufacture of resins is concerned, it is usually most convenient to employ a catalyst such as illustrated by previous examples.

Previous reference has been made to the use of a single phenol of each particular type, or a single oxyalkylating agent. Obviously, a mixture of reactants may be employed, for instance, a mixture of cardanol and hydrogenated cardanol, on the one hand, and a mixture of trifunctional phenols, on the other hand; for instance, a mixture of para-cresol and para-amylphenol. It is extremely difficult to depict the structure of a resin made from a single difunctional phenol, as, for example, from para-amylphenol and formaldehyde, or from cardanol and formaldehyde. When a mixture of phenols is used, such as cardanol and amylphenol, one runs into even greater complexity of structure.

If a mixture of aldehydes is employed, for instance, acetaldehyde and butyraldehyde, or acetaldehyde and formaldehyde, or benzaldehyde and acetaldehyde, the final structure of the resin becomes even more complicated and possibly depends on the relative reactivity of the aldehydes. For that matter, one might be producing simultaneously two different resins in what would actually be a mechanical mixture, although such mixtures might exhibit some unique properties, as compared with a mixture of the same two resins prepared separately. Similarly, as has been suggested, one might use a combination of oxyalkylating agents; for instance, one might partially oxyalkylate with ethylene oxide and then finish off with propylene oxide. It is understood that the use of oxyalkylated derivatives of such resins, derived from such plurality of reactants instead of being limited to a single reactant from each of the three classes, is contemplated and here included, for the reason that they are obvious variants.

Having obtained a suitable resin of the kind described, such resin is subjected to treatment with a low molal reactive alpha-beta olefine oxide so as to render the product distinctly hydrophile in nature, as indicated by the fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide and methylglycide. Glycide may be, of course, considered as a hydroxypropylene oxide and methyl glycide as a hydroxy butylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide, the oxygen-carbon ratio is 1:2. In glycide, it is 2:3; and in methyl glycide, 1:2. In such compounds, the ratio is very favorable to the production of hydrophile or surface-active properties. However, the ratio, in propylene oxide, is 1:3, and in butylene oxide, 1:4. Obviously, such latter two reactants are satisfactorily employed only where the resin composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a nonvolatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation in presence of an inert solvent such as xylene, cymene, decalin, ethylene glycol diethylether, diethyleneglycol diethylether, or the like, although with many resins, the oxyalkylation proceeds satisfactorily without a solvent. Since xylene is cheap and may be permitted to be present in the final product used as a demulsifier, it is our preference to use xylene. This is particularly true in the manufacture of products from low-stage resins, i. e., of 3 and up to and including 7 units per molecule.

If a xylene solution is used in an autoclave as hereinafter indicated, the pressure readings of course represent total pressure, that is, the combined pressure due to xylene and also due to ethylene oxide or whatever other oxyalkylating agent is used. Under such circumstances it may be necessary at times to use substantial pressures to obtain effective results, for instance, pressures up to 300 pounds along with correspondingly high temperatures, if required.

However, even in the instance of high-melting resins, a solvent such as xylene can be eliminated in either one of two ways: After the introduction of approximately 2 or 3 moles of ethylene oxide, for example, per phenolic nucleus, there is a definite drop in the hardness and melting point of the resin. At this stage, if xylene or a similar solvent has been added, it can be eliminated by distillation (vacuum distillation if desired) and the subsequent intermediate, being comparatively soft and solvent-free, can be reacted further in the usual manner with ethylene oxide or some other suitable reactant.

Another procedure is to continue the reaction to completion with such solvent present and then eliminate the solvent by distillation in the customary manner.

Another suitable procedure is to use propylene oxide or butylene oxide as a solvent as well as a reactant in the earlier stages along with ethylene oxide, for instance, by dissolving the powdered resin in propylene oxide even though oxyalkylation is taking place to a greater or lesser degree. After a solution has been obtained which represents the original resin dissolved in propylene oxide or butylene oxide, or a mixture which includes the oxyalkylated product, ethylene oxide is added to react with the liquid mass until hydrophile properties are obtained. Since ethylene oxide is more reactive than propylene oxide or butylene oxide, the final product may contain some unreacted propylene oxide or butylene oxide which can be eliminated by volatilization or distillation in any suitable manner.

Attention is directed to the fact that the resins herein described must be fusible or soluble in an organic solvent. Fusible resins invariably are soluble in one or more organic solvents such as those mentioned elsewhere herein. It is to be emphasized, however, that the organic solvent employed to indicate or assure that the resin meets this requirement need not be the one used in oxyalkylation. Indeed solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance to 100 to 200 mesh, and a slurry or suspension prepared in xylene or the like, and subjected to oxyalkylation. The fact that the resin is soluble in an organic solvent or the fact that it is fusible means that it consists of separate molecules. Phenol-aldehyde resins of the type herein specified possess reactive hydroxyl groups and are oxyalkylation susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner, but one may employ an emulsification test. Emulsions come into existence, as a rule, through the presence of a surface-active emulsifying agent. Some surface-active emulsifying agents, such as mahogany soap may produce a water-in-oil emulsion, or an oil-in-water emulsion, depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50–50 solution is then mixed with 1–3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type), particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation, using 2 moles of ethylene oxide for each phenolic hydroxyl, is helpful. The procedure followed in preparing such a "standard" resin for comparison was the same procedure, as described in Example 1a, preceding. A specific example of ingredients suitable for making such resin is as follows:

| | Grams |
|---|---|
| Para-tertiary butylphenol | 150 |
| Formaldehyde (37%) | 90 |
| Concentrated HCl | 1.5 |
| Monoalkyl ($C_{10}$–$C_{20}$, principally $C_{12}$–$C_{14}$) benzene monosulfonic acid sodium salt | 0.8 |
| Xylene | 100 |

Such resin, prior to oxyalkylation, has a molecular weight indicating about 4½ units per resin molecule. Such resin, when diluted with an equal weight of xylene, will serve to illustrate the above emulsification test.

In a few instances, the resin may not be sufficiently soluble in xylene alone, but may require the addition of some ethyleneglycol diethylether, as described elsewhere. It is understood that such mixture, or any other similar mixture, is considered the equivalent of xylene for the purpose of this test.

In many cases there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature or structure of the resin polymer obtained varies somewhat with the conditions of reaction, the proportions of reactants, the nature of the catalyst, etc.

Based on molecular weight determinations, most of the resins prepared as herein described, particularly in the absence of a secondary heating step, contain 3 to 6 or 7 phenolic nuclei with approximately 4½ or 5½ nuclei as an average. More drastic conditions of resinification yield resins of greater chain length. Such more intensive resinification is a conventional procedure and may be employed if desired. Molecular weight, of course, is measured by any suitable procedure, particularly by cryoscopic methods; but using the same reactants and using more drastic conditions of resinification one usually finds that higher molecular weights are indicated by higher melting points of the resins and a tendency to decreased solubility. See what has been said elsewhere herein in regard to a secondary step involving the heating of a resin with or without the use of vacuum.

We have previously pointed out that either an alkaline or acid catalyst is advantageously used in preparing the resin. A combination of catalysts is sometimes used in two stages; for instance, an alkaline catalyst is sometimes employed in a first stage, followed by neutralization and addition of a small amount of acid catalyst in a second stage. It is generally believed that even in the presence of an alkaline catalyst, the number of moles of aldehyde, such as formaldehyde, must be greater than the moles of phenol employed in order to introduce methylol groups in the intermediate stage. There is no indication that such groups appear in the final resin if prepared by the use of an acid catalyst. It is possible that such groups may appear in the finished resins prepared solely with an alkaline catalyst; but we have never been able to confirm this fact in an examination of a large number of resins prepared by ourselves. Our preference, however, is to use an acid-catalyzed resin, particularly employing a formaldehyde-to-phenol ratio of 0.95 to 1.20 and, as far as we have been able to determine, such resins are free from methylol groups. As a matter of fact, it is probable that in acid-catalyzed resinifications, the methylol structure may appear only momentarily at the very beginning of the reaction and in all probability is converted at once into a more complex structure during the intermediate stage.

One procedure which can be employed in the use of a new resin to prepare products for use in the process of the invention is to determine the hydroxyl value by the Verley-Bölsing method or its equivalent. The resin, as such, or in the form of a solution, as described, is then treated with ethylene oxide in presence of 0.5% to 2% of sodium methylate, as a catalyst in step-wise fashion. The conditions of reaction, as far as time or percent is concerned, are within the range previously indicated. With suitable agitation the ethylene oxide, if added in molecular proportion, combines within a comparatively short time, for instance, a few minutes to 2 to 6 hours, but in some instance, requires as much as 8 to 24 hours. A useful temperature range is from 125° to 225° C. The completion of the reaction of each addition of ethylene oxide in step-wise fashion is usually indicated by the reduction or elimination of pressure. An amount conveniently used for each addition is generally equivalent to a mole or two moles of ethylene oxide per hydroxyl radical. When the amount of ethylene oxide added is equivalent to approximately 50%, by weight, of the original resin, a sample is tested for incipient hydrophile properties, by simply shaking up in water as is, or after the elimination of the solvent, if a solvent is present. The amount of ethylene oxide used to obtain a useful demulsifying agent, as a rule, varies from 70%, by weight of the original resin to as much as five or six times the weight of the original resin. In the case of a resin derived from para-tertiary butylphenol from cardanol, hydrogenated cardanol, etc., in combination with a difunctional phenol, as herein described, as little as 50%, by weight, of ethylene oxide may give suitable solubility. With propylene oxide, even a greater molecular proportion is required and sometimes a resultant of only limited hydrophile properties is obtainable. The same is true to even a greater extent with butylene oxide. The hydroxylated alkylene oxides are more effective in solubilizing properties than the comparable compounds in which no hydroxyl is present.

Attention is directed to the fact that in the subsequent examples reference is made to the step-wise addition of the alkylene oxide, such as ethylene oxide. It is understood, of course, there is no objection to the continuous addition of alkylene oxide until the desired stage of reaction is reached. In fact, there may be less of a hazard involved and it is often advantageous to add the alkylene oxide slowly in a continuous stream and in such amount as to avoid exceeding the higher pressures noted in the various examples or elsewhere.

It may be well to emphasize the fact that when resins are produced from difunctional phenols and some of the higher aliphatic aldehydes, such as acetaldehyde, the resultant is a comparatively soft or pitch-like resin at ordinary temperatures. Such resins become comparatively fluid at 110° to 165° C. as a rule, and thus can be readily oxyalkylated, preferably oxyethylated, without the use of a solvent.

What has been said previously is not intended to suggest that any experimentation is necessary to determine the degree of oxyalkylation, and particularly oxyethylation. What has been said previously is submitted primarily to emphasize the fact that these remarkable oxyalkylated resins having surface activity show unusual properties as the hydrophile character varies from a minimum to an ultimate maximum. One should not underestimate the utility of any of these products in a surface-active or sub-surface-active range without testing them for demulsification. A few simple laboratory tests which can be conducted in a routine manner will usually give all the information that is required.

For instance, a simple rule to follow is to prepare a resin having at least three phenolic nuclei and being organic solvent-soluble. Oxyethylate such resin, using the following four ratios of moles of ethylene oxide per phenolic unit equivalent: 2 to 1; 6 to 1; 10 to 1; and 15 to 1. From a sample of each product remove any solvent that may be present, such as xylene. Prepare 0.5% and 5.0% solutions in distilled water, as previously indicated. A mere examination of such series will generally reveal an approximate range of minimum hydrophile character, moderate hydrophile character, and maximum hydrophile character. If the 2 to 1 ratio does not show minimum hydrophile character by test of the solvent-free product, then one should test its capacity to form an emulsion when admixed with xylene or other insoluble solvent. If neither test shows the required minimum hydrophile property, repetition using 2½ to 4 moles per phenolic nucleus will serve. Moderate hydrophile character should be shown by either the 6 to 1 or 10 to 1 ratio. Such moderate hydrophile character is indicated by the fact that the sol in distilled water within the previously mentioned concentration range is a permanent translucent sol, when viewed in a comparatively thin layer, for instance, the depth of a test tube. Ultimate hydrophile character is usually shown at the 15 to 1 ratio, in that adding a small amount of an insoluble solvent, for instance, 5% of xylene, yields a product which will give, at least temporarily, a transparent or translucent sol of the kind just described. The formation of a permanent foam, when a 0.5% to 5.0% aqueous solution is shaken, is an excellent test for surface-activity. Previous reference has been made to the fact that other oxyalkylating agents may require the use of increased amounts of alkylene oxide. However, if one does not even care to go to the trouble of calculating molecular weights, one can simply arbitrarily prepare compounds containing ethylene oxide equivalent to about 50% to 75%, by weight, for example, 65%, by weight, of the resin to be oxyethylated; a second example using approximately 200% to 300%, by weight, and a third example using about 500% to 750%, by weight, to explore the range of hydrophile-hydrophobe balance.

A practical examination of the factor of oxyalkylation level can be made by a very simple test, using a pilot plant autoclave having a capacity of about 10 to 15 gallons, as hereinafter described. Such laboratory-prepared routine compounds can then be tested for solubility, and, generally speaking, this is all that is required to give a suitable variety covering the hydrophile-hydrophobe range. All these tests, as stated, are intended to be routine tests and nothing more. They are intended to teach a person, even though unskilled in oxyethylation or oxyalkylation, how to prepare in a perfectly arbitrary manner, a series of compounds illustrating the hydrophile-hydrophobe range.

Ordinarily, the oxyalkylation is carried out in autoclaves provided with agitators or stirring devices. We have found that the speed of the agitation markedly influences the time of reaction. In some cases, the change from slow speed agitation, for example, in a laboratory autoclave with a stirrer operating at a speed of 60 to 200 R. P. M. to high speed agitation, with the stirrer operating at 250 to 350 R. P. M., reduces the time required for oxyalkylation by about one-half to two-thirds. Frequently xylene-soluble products which give insoluble products by procedures employing comparatively slow speed agitation give suitable hydrophile products when produced by similar procedure, but with high speed agitation, as a result, we believe of the reduction in the time requirement with consequent elimination or curtailment of opportunity for curing or etherization. Even if the formation of an insoluble product is not involved, it is frequently advantageous to speed up the reaction, thereby reducing production time, by increasing agitating speed. In large scale operations we have demonstrated that economical manufacturing results from continuous oxyalkylation, i. e., an operation in which the alkylene oxide is continuously fed to the reaction vessel, with a high speed agitation, i. e., an agitator operating at 250 to 350 R. P. M. Continuous oxyalkylation, other conditions being the same, is more rapid than batch oxyalkylation, but the latter is ordinarily more convenient for laboratory operation.

As far as we know, some thermoplastic of fusible cardanol or mixed cardanol resins are offered in the open market for purposes other than those herein described. If one obtains such a resin, one might have to make certain determinations, in order to make the quickest approach to the appropriate oxyalkylation range. For instance, one should know (a) the molecular size, indicating the number of phenolic units; (b) the nature of the aldehydic residue, which is usually $CH_2$; and (c) the nature of the substituent, which may be a cardanol type resin alone or a hydrogenated cardanol type, or a chlorinated cardanol type, or the resin obtained from a mixture, as previously described. With such information one is in substantially the same position as if one had personally made the resin prior to oxyethylation.

In the instant case, such a variety of phenols may be employed that it is somewhat difficult to calculate a molecular weight except as a statistical average. If, on the other hand, a resin is obtained from a single phenol, such as cardanol, then the molecular weight of the internal structural units of the resin of the following oversimplified formula:

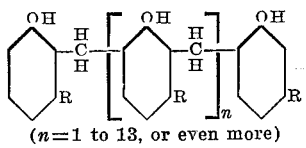

($n=1$ to 13, or even more)

is given approximately by the formula: (mol. wt. of phenol−2) plus mol. wt. of methylene or substituted methylene radical. The molecular weight of the resin would be $n$ times the value for the internal limit, plus the values for the terminal units. The left-hand terminal unit of the above structural formula, it will be seen, is identical with the recurring internal unit, except that it has one extra hydrogen. The right-hand terminal unit lacks the methylene bridge element. Using one internal unit of a resin as the basic element, a resin's molecular weight is given approximately by taking ($n$ plus 2) times the weight of the internal element. Where the resin molecule has only 3 phenolic nuclei as in the structure shown, this calculation will be in error by several percent; but as it grows larger, to contain 6, 9, or 12 phenolic nuclei, the formula comes to be more satisfactory. Using such an approximate weight, one need only introduce, for example, two molal weights of ethylene oxide, or slightly more, per phenolic nucleus, to produce a product of minimal hydrophile character. Further oxyalkylation gives enhanced hydrophile character. Although we have prepared and tested a large number of oxyethylated products of the type described herein, we have found no instance where the use of less than 2 moles of ethylene oxide per phenolic nucleus gave desirable products.

If the resin were obtained solely from the difunctional phenol, the formula may differ only in regard to the position of the substituent group or in the size of such substituent group. In other words, being as follows:

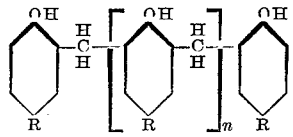

Actually, knowing the two phenols employed, i. e., the anacardic acid phenol and the difunctional phenol, and the ratios of the two, a suitable estimate can be made in light of such limiting formulae as the two preceding.

The following Examples 1b through 9b, are included to exemplify the production of oxyalkylation products of the invention from resins, specifically, resins described in nine of the foregoing Examples 1a to 26a, giving exact and complete details for the carrying out of the procedure. In the table which appears further on in the specification are given data with respect to the oxyethylation of a number of the resins previously described, it being understood that in preparing the products referred to in the table the manipulative steps used are those of Examples 1b to 9b.

EXAMPLE 1b

The resin employed was the acid catalyzed acetaldehyde resin obtained from cardanol in combination with either ortho or para-cresol, as described in Example 4a. The weight of the resin solution employed was 310 grams. This solution contained 35% xylene and 65% resin. To this mixture there was added 2½% of sodium methylate, based on the weight of the resin. (5 grams). The solution or suspension was placed in the autoclave and approximately 400 grams of ethylene oxide, by weight, were added in four portions of 100 grams each. After each portion was added, the reaction was permitted to take place for approximately two to ten hours, as indicated in the subsequent table. The temperature employed was approximately 160° to 166° C. and the maximum gauge pressure was approximately 140 to 185 pounds per square inch, as indicated by the table. At the end of each reaction period there was no further drop in pressure, thus indicating that all the ethylene oxide present had reacted and the pressure registered on the gauge represented the vapor pressure of xylene at the indicated temperature. After the fourth and final portion of ethylene oxide had been added, a test was made on the resultant.

In this particular operation the product, after the first addition of ethylene oxide, still showed the same insoluble characteristics as prior to oxyethylation. At the end of the second addition of ethylene oxide, the product was emulsifiable. At the end of the third period it was distinctly more emulsifiable than before, and at the end of the fourth period it was distinctly soluble. The initial soluble point approximates the addition of ethylene oxide equal to slightly less than 100% of the weight of the resin. Needless to say, the final product contains xylene, which, if removed, would yield a composition showing an even greater solubility.

In order to obtain greater solubility, a second series was run in which the amount of ethylene oxide was increased by approximately 400 grams added in four further successive additions of 100 grams each. Prior to adding the second 400 grams, another portion of 4 grams of sodium methylate was added and the conditions of reaction were substantially the same as in the first series. After the addition of 600 grams of ethylene oxide, the product was almost clear, showing only a moderate turbidity and at 800 grams the solution became perfectly clear. The product obtained after the addition of 400 grams of ethylene oxide was an amber to dark brown fluid, having a moderate viscosity suggestive of castor oil. The product obtained after adding 800 grams of ethylene oxide, was lighter in color and less viscous.

EXAMPLE 2ᵇ

The same reactants and procedure were employed as in Example 1ᵇ, preceding, except that propylene oxide was employed instead of ethylene oxide. The resultant, even on the addition of the alkylene oxide in the weight proportions of the previous example, has diminished hydrophile properties, in comparison with the resultants of Example 1ᵇ. This illustrates the point that propylene oxide and butylene oxide give products of lower levels of hydrophile properties than does ethylene oxide.

EXAMPLE 3ᵇ

The same reactants and procedure were followed as in Example 1ᵇ, except that one mole of glycide was employed initially per hydroxyl radical. This particular reaction was conducted with extreme care and the glycide was added in small amounts representing fractions of a mole. Ethylene oxide was then added, following the procedure of Example 1ᵇ, to produce products of greater hydrophile properties. We are extremely hesitant to suggest even the experimental use of glycide and methylglycide, for the reason that disastrous results may be obtained, even in experimentation with laboratory quantities.

EXAMPLE 4ᵇ

The same procedure was followed as in Example 1ᵇ, except that instead of employing the resin used in Example 1ᵇ, there was substituted instead the resin of Example 1ᵃ. The product obtained was similar in appearance, color and viscosity to that of Example 1ᵇ.

EXAMPLE 5ᵇ

The same reactants and procedure were employed as in Example 1ᵇ, except that the alkaline catalyzed resin obtained from cardanol and para-cresol was used. This resin is described under the heading of Example 2ᵃ. The oxyethylated products in color, appearance and viscosity were like the products of Example 1ᵇ.

EXAMPLE 6ᵇ

The same reactants and procedure were employed as in Example 1ᵇ, except that the sulfuric acid catalyzed cardanol difunctional cresol resin obtained by the use of acetaldehyde and described under the heading of Example 3ᵃ, was used instead of the particular resin described in Example 1ᵇ, preceding. The product obtained is similar in appearance to those described under the heading of Example 1ᵇ.

EXAMPLE 7ᵇ

The same procedure was employed as in Example 1ᵇ, preceding, except that the resin used was that described under the heading of Example 9ᵃ. This resin was obtained from cardanol, para-ethylphenol, and formaldehyde, using an acid catalyst. The appearance of the product was the same as in preceding examples.

EXAMPLE 8ᵇ

The same procedure was followed, except that the resin was obtained in the manner described under the heading of Example 13ᵃ. Note that in this instance, instead of an alkaline catalyst, tin tetrachloride was employed. See what is said hereafter in the text preceding the table. This particular product had the same appearance as previous products, but showed decidedly less solubility, apparently due to the presence of the chlorine atom in the chlorinated cardanol.

EXAMPLE 9ᵇ

The resin employed was that described under the heading of Example 14ᵃ; otherwise, the procedure, reactants, etc. were the same as in Example 1ᵇ, preceding. The appearance of the final products was similar to preceding examples, especially the particular one where chlorinated cardanol was employed.

Our experience with chlorinated reactants during oxyalkylation, particularly oxyethylation, is that an alkaline catalyst is not apt to be satisfactory, if the chlorine shows any lability at all. This is usually the case, and as a result, the alkaline catalyst is converted into sodium chloride with the corresponding change in the organic reactant. In such instances, we prefer to use the type of reactant employed in a Friedel-Crafts reaction. Such catalyst is an acid in some of the common systems of acid based nomenclature. Examples include aluminum chloride, ferric chloride, stannic chloride, etc. In the oxyethylation of Example 13ᵃ, as described previously and described in further detail in the subsequent table, tin tetrachloride was used instead of sodium methylate.

The resins prior to oxyethylation vary from tacky resins having a suggestion of hardness, to tacky viscous liquids. Their color varies from a reddish-amber to a blackish-amber, particularly in the latter direction when the amount of cardanol or cardanol derivative increases. In the manufacture of resins, as the reaction progresses the reaction mass frequently goes through a liquid state, to a subresinous state, and then reaches the final tacky appearance which is characteristic of these resins having a long chain substituent. As the resin is subjected to oxyethylation, these same physical changes tend to take place in reverse. If one starts with a viscous tacky resin, incipient oxyalkylation tends to make it tacky and somewhat more liquid, and further oxyalkylation makes the tackiness disappear and changes the product to a liquid. Thus, as the resin is oxyalkylated it decreases in viscosity, i. e., becomes more liquid or changes from a solid to a liquid, particularly when it is converted to the water-dispersible or water-soluble stage. The color of the oxyalkylated derivative is usually considerably lighter than the original product from which it is made, varying from a deep straw color to an amber or reddish-amber. The viscosity usually varies from that of an oil, like castor oil, to that of a thick viscous syrup. Some products are waxy. The presence of a solvent, such as 15% xylene or the like, thins the viscosity considerably and also reduces the color in dilution. No undue significance need be attached to the color, for the reason that if the same componud is prepared in glass and in iron, the latter usually has somewhat darker color. If the resins are prepared as customarily employed in varnish resin manufacture, i. e., a procedure that excludes the presence of oxygen during resinification and subsequent cooling of the resin, then, of course, the initial resin is much lighter in color. We have employed some resins which initially are almost water-white and also yield a lighter colored final product.

The same procedure as described above has been applied to a large variety of resins of the kind described previously, including resins obtained from mixtures of phenols, and we have found that these oxyalkylated products having the required minimum hydrophile properties, are all effective for use in the process of the invention. In many cases resins used were obtained from aldehydes other than formaldehydes, i. e., higher aldehydes having not over 8 carbon atoms. Similarly, some of the resins, instead of being obtained by use of acid catalysts, were obtained by use of alkaline catalysts or sequential use of both types of catalyst. In some instances the resins were obtained by a process which involved a secondary step of heating alone or under vacuum. In the series of examples represented by Examples 1$^b$ through 9$^b$, the amount of alkylene oxide added covers the range up to about three times the weight of the initial resin. The data given in the table which follows show that many of the most effective compounds for demulsification purposes, require but about one-half this amount of alkylene oxide, in particular, ethylene oxide, for example, from 150% to possibly 200%, by weight. Larger amounts of ethylene oxide, for example, amounts up to six times the weight of the initial resin may be used, even though the solubility of such products may, in some cases, be less than the solubility of derivatives obtained with lesser amounts of alkylene oxide.

The table which follows gives data with respect to the preparation and properties of a series of oxyethylated resins which have been tested for demulsifying action on a number of crude oil emulsions. Each product was obtained by the oxyethylation of a product of one of Examples 1$^a$ through 26$^a$. The tabulated data include the example number, in which the preparation of the resin is described and the resin is identified, the amount of ethylene oxide added per weight of resin, the amount and nature of the catalyst used for the oxyethylation operations, the number of steps in which the oxyethylation was carried out, the hydrophile properties not only of the final product, but of intermediate products, the temperatures used in the oxyethylation steps, the maximum pressures (gauge) of the oxyethylation steps, and the length of time required for each step. The technique used was that described in Example 1$^b$.

In the table, the first column on each page gives the example number, thus identifying the resin used. Column A gives the weight of the resin solution used in grams; Column B the percentage of solvent in the resin solution used; Column C the percent of alkaline catalyst (sodium methylate) based on amount of resin used in the oxyethylation. Columns $D_1$ through $H_5$ give the data with respect to oxyethylation operations; Column $D_1$ giving the maximum temperature in degrees C.; Column $E_1$ the gauge pressure in pounds per square inch; Column $F_1$ the number of grams of ethylene oxide added in the first addition; Column $G_1$ the time required for the first addition in hours; and Column $H_1$ the hydrophile properties of the product resulting from the first addition. Columns $D_2$ through $H_2$ give similar data for the second addition of ethylene oxide; Columns $D_3$ through $H_3$ similar data for the third addition, etc.

Table

| Example Number | Resin | | | Additions of Ethylene Oxide—First Addition | | | | |
|---|---|---|---|---|---|---|---|---|
| | A | B | C | $D_1$ | $E_1$ | $F_1$ | $G_1$ | $H_1$ |
| 4$^a$ | 310 | 35.0 | 2.5 | 160 | 140 | 100 | 10 | Insoluble. |
| 10$^a$ | 264 | 36.4 | 2.4 | 158 | 110 | 50 | 7 | Emulsifiable. |
| 11$^a$ | 313 | 39.6 | 2.0 | 160 | 150 | 100 | 7½ | Do. |
| 13$^a$ [1] | 499 | 45.0 | 1.0 | 160 | 90 | 50 | 6 | Non-emulsifiable. |
| 14$^a$ | 529 | 29.0 | 2.1 | 160 | 180 | 150 | ¾ | Somewhat emulsifiable. |
| 15$^a$ | 471 | 33.0 | 2.5 | 175 | 200 | 160 | 7 min. | Non-emulsifiable. |
| 17$^a$ | 644 | 58.0 | 2.4 | 154 | 200 | 160 | 1 | Do. |
| 18$^a$ | 635 | 39.0 | 2.3 | 170 | 150 | 150 | 10 min. | Do. |
| 19$^a$ | 460 | 74.0 | 3.3 | 150 | 210 | 160 | 1⅓ | Do. |
| 20$^a$ | 816.5 | 80.0 | 3.7 | 175 | 150 | 160 | ⅓ | Somewhat emulsifiable. |
| 21$^a$ | 506 | 47.0 | 2.5 | 168 | 210 | 150 | 2 | Insoluble. |
| 22$^a$ | 482 | 50.0 | 2.8 | 185 | 220 | 150 | ¼ | Not emulsifiable. |
| 23$^a$ | 476 | 15.0 | 2.0 | 150 | 160 | 100 | 3 | Somewhat emulsifiable. |
| 24$^a$ | 508 | 13.0 | 1.1 | 156 | 105 | 100 | 3 | Not soluble. |
| 25$^a$ | 307 | 34.0 | 2.0 | 140 | 115 | 100 | 6 | Somewhat emulsifiable. |
| 26$^a$ | 409 | 43.0 | 1.7 | 156 | 110 | 100 | 5½ | Water insoluble. |

[1] Tin tetrachloride used as a catalyst instead of sodium methylate.

Table

| Example Number | Additions of Ethylene Oxide—Second Addition | | | | |
|---|---|---|---|---|---|
| | $D_2$ | $E_2$ | $F_2$ | $G_2$ | $H_2$ |
| 4$^a$ | 160 | 185 | 100 | 6 | Emulsifiable. |
| 10$^a$ | 150 | 145 | 50 | 14 | Do. |
| 11$^a$ | 156 | 170 | 100 | 8½ | Do. |
| 13$^a$ [1] | 165 | 205 | 150 | 6½ | Insoluble. |
| 14$^a$ | 155 | 185 | 150 | ½ | Almost emulsifiable. |
| 15$^a$ | 165 | 180 | 150 | 8 min. | Emulsifiable. |
| 17$^a$ | 170 | 240 | 175 | 1 | Non-emulsifiable. |
| 18$^a$ | 175 | 150 | 150 | ½₂ | Not emulsifiable. |
| 19$^a$ | 185 | 200 | 150 | ½ | Pale amber, non-homogeneous liquid; emulsifiable. |
| 20$^a$ | 170 | 175 | 160 | 1 | Water-emulsifiable; viscous; salve-like.[2] |
| 21$^a$ | 165 | 190 | 150 | 3 | Somewhat emulsifiable. |
| 22$^a$ | 166 | 220 | 150 | 1¼ | Emulsifiable. |
| 23$^a$ | 156 | 125 | 100 | 6¼ | Water-emulsifiable. |
| 24$^a$ | 154 | 130 | 100 | 10 | Not emulsifiable. |
| 25$^a$ | 140 | 115 | 100 | 6¾ | Emulsifiable. |
| 26$^a$ | 150 | 165 | 100 | 7 | Somewhat soluble, tending to rubberize; extremely stable. Faster stirring indicated. |

[1] Tin tetrachloride used as a catalyst instead of sodium methylate.
[2] 100 grams of diethyl diethyleneglycol added to thin at this point.

Table

Additions of Ethylene Oxide—Third Addition

| Example Number | D₃ | E₃ | F₃ | G₃ | H₃ |
|---|---|---|---|---|---|
| 4ᵃ | 162 | 100 | 100 | 3 | Emulsifiable. |
| 10ᵃ | 150 | 148 | 50 | 9 | Do. |
| 11ᵃ | 150 | 100 | 100 | 6 | Do. |
| 13ᵃ¹ | 165 | 195 | 150 | 2¼ | Do. |
| 14ᵃ | 155 | 180 | 150 | ½ | Do. |
| 15ᵃ | 165 | 140 | 150 | 1⁄12 | Water-soluble. |
| 17ᵃ | 150 | 170 | 170 | 1⅙ | Beginning to emulsify. |
| 18ᵃ | 170 | 170 | 150 | 8 min. | Partially soluble. |
| 19ᵃ | 155 | 140 | 160 | ½ | Water-soluble. |
| 20ᵃ | 175 | 160 | 160 | 1 | Emulsifiable and more so in absence of solvent. |
| 21ᵃ | 175 | 205 | 200 | 3½ | Emulsifiable. |
| 22ᵃ | 170 | 200 | 150 | 1 | Amber-colored fluid; almost soluble; aqueous solution slightly opaque. |
| 23ᵃ | 164 | 115 | 100 | 6 | Emulsifiable. |
| 24ᵃ | 166 | 75 | 100 | 3½ | Beginning to emulsify. |
| 25 | 142 | 140 | 100 | 6½ | Distinctly emulsifiable. |

¹ Tin tetrachloride used as a catalyst instead of sodium methylate.

Fourth Addition

| Example Number | D₃ | E₃ | F₃ | G₃ | H₃ |
|---|---|---|---|---|---|
| 4ᵃ | 166 | 162 | 100 | 2 | Soluble. |
| 10ᵃ | 146 | 140 | 50 | 6½ | Emulsifiable. |
| 11ᵃ | 148 | 115 | 100 | 6½ | Almost soluble. |
| 13ᵃ¹ | 155 | 215 | 150 | 6¼ | Do. |
| 14ᵃ | 165 | 170 | 150 | 1 | Water-soluble. |
| 17ᵃ | 160 | 160 | 170 | ¾ | Emulsifiable. |
| 18ᵃ | 165 | 120 | 150 | 1⁄12 | Increased solubility. |
| 21ᵃ | 186 | 192 | 200 | 4½ | Soluble. |
| 23ᵃ | 158 | 110 | 120 | 6 | Water-soluble. |
| 24ᵃ | 160 | 100 | 100 | 4 | Water-emulsifiable. |
| 25ᵃ | 156 | 140 | 100 | 7 | Almost water-soluble. |

¹ Tin tetrachloride used as a catalyst instead of sodium methylate.

Table

Additions of Ethylene Oxide—Fifth Addition

| Example Number | D₅ | E₅ | F₅ | G₅ | H₅ |
|---|---|---|---|---|---|
| 10ᵃ | 140 | 142 | 50 | 6 | Emulsifiable. |
| 11ᵃ | 156 | 175 | 100 | 7 | Almost soluble. |
| 17ᵃ | 165 | 160 | 190 | ⅚ | Viscous salve-like product; reddish-amber in color; soluble. |
| 18ᵃ | 170 | 110 | 150 | ⅙ | Water-soluble; reddish-black liquid. |
| 24ᵃ | 162 | 145 | 100 | 3 | Slight increase in solubility. |

Sixth Addition

| Example Number | D₆ | E₆ | F₆ | G₆ | H₆ |
|---|---|---|---|---|---|
| 10ᵃ | 150 | 144 | 100 | 13 | Soluble. |
| 24ᵃ | 154 | 100 | 100 | 7 | Almost water-soluble. |

Seventh Addition

| Example Number | D₇ | E₇ | F₇ | G₇ | H₇ |
|---|---|---|---|---|---|
| 24ᵃ | | 164 | 100 | 100 | 2½ Water-soluble. |

In appearance the final oxyethylated products in the presence of solvent were, in general, liquids of varying viscosities and varied in color from light amber to dark brown, reddish-brown, or at times, were distinctly reddish. It will be noted that in some instances the resins contained nine parts of other phenols to one part of an anacardic acid phenol. In other instances, the resin was obtained from mixtures containing nine moles of an anacardic acid phenol to one mole of the difunctional phenol.

By and large, the viscosity was in the nature of castor oil or a lightly blown castor oil. Some of the products were comparatively non-viscous; others as noted, more so. In some instances, the tables themselves include reference to the viscosity of the products, although this, of itself, is not particularly material, because of the presence of a solvent.

Color, in many cases, is more intimately related to the presence of a trace of iron or presence of some oxidized organic material, or even to the aldehyde as in the case of furfural or benzaldehyde.

The foregoing description of the appearance, viscosity, etc., of the final oxyethylated product with respect to which data are given in the table relates to the properties of the products in the presence of the solvent. It is to be understood, that when these products are used for demulsification, it is unnecessary to separate them from the solvent used in their preparation, and ordinarily commercial products will, if prepared with the use of a solvent, be distributed without removal of the solvent, and frequently with the addition of other solvent materials, other agents, etc.

Actually, in considering the ratio of alkylene oxide to add, and we have previously pointed out that this can be predetermined, using laboratory tests, it is our actual preference, from a practical standpoint, to make tests on a small pilot plant scale. Our reason for so doing is that we make one run, and only one, and that we have a complete series which shows the progressive effect of introducing the oxyalkylating agent, for instance, the ethyleneoxy radicals. Our preferred procedure is as follows: We prepare a suitable resin, or for that matter, purchase it in the open market. We employ 8 pounds of resin and 4 pounds of xylene and place the resin and xylene in a suitable autoclave with an open reflux condenser. We prefer to heat and stir until the solution is complete.

We have pointed out that the resins obtained from cardanol, cardanol derivatives, or these same phenols in combination with other phenol, such as metacresol or para-amylphenol, are apt to yield soft resins or viscous tacky fluids. If such resins are used, a solvent need not be added, but may be added as a matter of convenience, or for comparison, if desired. We then add a catalyst, for instance, 2% of caustic soda, in the form of a 20% to 30% solution, and remove the water of solution or formation. Attention is directed to what has been said previously about replacing 2% of an alkaline catalyst, such as caustic soda or sodium methylate, with about 1½% or thereabouts of a metallic chloride, such as tin tetrachloride. We then shut off the reflux condenser and use the equipment as an autoclave only, and oxyethylate until a total of 60 pounds of ethylene oxide have been added, equivalent to 750% of the original resin. We prefer a temperature of about 150° C. to 175° C. We also take samples at intermediate points, as indicated in the following table:

| Percentage | Pounds of Ethylene Oxide Added per 8-pound Batch |
|---|---|
| 50% | 4.0 |
| 66⅔ | 5.33 |
| 75 | 6.0 |
| 100 | 8.0 |
| 150 | 12.0 |
| 200 | 16.0 |
| 300 | 24.0 |
| 400 | 32.0 |
| 500 | 40.0 |
| 600 | 48.0 |
| 750 | 60.0 |

Oxyethylation to 750% can usually be completed within 30 hours and frequently more quickly.

The samples taken are rather small, for instance, 2 to 4 ounces, so that no correction need be made in regard to the residual reaction mass. Each sample is divided in two. One-half the sample is placed in an evaporating dish on the steam bath overnight so as to eliminate the xylene. Then 1.5% solutions are prepared from both series of samples, i. e., the series with xylene present and the series with xylene removed.

Mere visual examination of any samples in solution may be sufficient to indicate hydrophile character or surface activity, i. e., the product is soluble, forming a colloidal sol, or the aqueous solution foams or shows emulsifying property. All these properties are related through adsorption at the interface, for example, a gas liquid interface or a liquid-liquid interface. If desired, surface-activity can be measured in any one of the usual wave using a DuNouy tensiometer or dropping pipette, or any other procedure for measuring interfacial tension. Any compound having sub-surface-activity, and all derived from the same resin and oxyalkylated to a greater extent, i. e., those having a greater proportion of alkylene oxide, are useful for the practice of this invention.

We have previously pointed out that when cardanol or cardanol derivatives of the kind herein described are used, either alone or in conjunction with a difunctional phenol, one could add a substantial amount of a trifunctional phenol, such as hydroxy benzene or metacresol. Needless to say, if one obtains an insoluble, infusible, resin from hydroxy benzene or metacresol, the mere addition of a very small proportion of cardanol derivative will not render the resin of such mixture soluble and fusible, if the usual procedure is employed. For this reason, we prefer to use a pilot plant test of the kind above described, for the reason that we can use the same procedure to evaluate the acceptability of a mixture containing a trifunctional phenol such as hydroxy benzene or metacresol. This is the same sort of procedure that one would employ to evaluate the tolerance of a resin made solely from a difunctional phenol, such as para-amylphenol, towards the presence of a trifunctional phenol. Previous reference has been made to the fact that one can conduct a laboratory scale test which will indicate whether or not a resin, although soluble in a solvent, will yield an insoluble rubbery product, i. e., a product which is neither hydrophile nor surface-active upon oxyalkylation, particularly extensive oxyethylation. It is also obvious that one may have a solvent-soluble resin which will result in an insoluble rubber at the ultimate stages of oxyethylation but not at the earlier stages. In other words, resins from such phenols, and at times resins obtained from chlorinated cardanol, show this characteristic. The addition of 2 or 3 moles of the oxyalkylating agent per phenolic nucleus, particularly ethylene oxide, gives a surface-active product which is perfectly satisfactory, while more extensive oxyethylation yields an insoluble rubber, i. e., an unsuitable product. It is obvious that this present procedure of evaluating trifunctional phenol tolerance is more suitable than the previous procedure.

It may be well to call attention to one result which may be noted in a long, drawn-out oxyalkylation, particularly oxyethylation, which would not appear in a normally conducted reaction. Reference has been made to cross-linking and its effect on solubility and also the fact that, if carried far enough, it causes incipient stringiness, then pronounced stringiness, usually followed by a semi-rubbery or rubbery stage. Incipient stringiness, or even pronounced stringiness, or even the tendency towards a rubbery stage, is not objectionable, so long as the final product is still hydrophile and at least sub-surface-active. Such material is frequently best mixed with a polar solvent, such as alcohol or the like, and preferably an alcoholic solution is used. The point which we want to make here, however, is this: Stringiness or rubberization at this stage may possibly be the result of etherification. Obviously if a suitable phenol and an aldehyde produce a non-cross-linked resin molecule, and if such molecule is oxyalkylated so as to introduce a plurality of hydroxyl groups in each molecule, then and in that event, if subsequent etherification takes place, one is going to obtain cross-linking in the same general way that one would obtain cross-linking in other resinification reactions. Ordinarily, there is little or no tendency towards etherification during the oxyalkylation step. If it does take place at all, it is only to an insignificant and undetectable degree. However, suppose that a certain weight of resin is treated with an equal weight of, or twice its weight of, ethylene oxide. This may be done in a comparatively short time, for instance, at 150° to 175° C. in 4 to 8 hours, or even less. On the other hand, if in an exploratory reaction, such as the kind previously described, the ethylene oxide were added extremely slowly in order to take stepwise samples, so that the reaction required 4 or 5 times as long to introduce an equal amount of ethylene oxide employing the same temperature, then etherification might cause stringiness or a suggestion of rubberiness. For this reason if in an exploratory experiment of the kind previously described there appears to be any stringiness or rubberiness, it may be well to repeat the experiment and reach the intermediate stage of oxyalkylation as rapidly as possible and then proceed slowly beyond this intermediate stage. The entire purpose of this modified procedure is to cut down the time of reaction so as to avoid etherification if it be caused by the extended time period.

It may be well to note one peculiar reaction sometimes noted in the course of oxyalkylation, particularly oxyethylation, of the thermoplastic resins herein described. This effect is noted in a case where a thermoplastic resin has been oxyalkylated, for instance, oxyethylated, until it gives a perfectly clear solution, even in the presence of some accompanying water-insoluble solvent such as 10% to 15% of xylene. Further oxyalkylation, particularly oxyethylation, may then yield a product which, instead of giving a clear solution as previously, gives a very milky solution suggesting that some marked change has taken place. One explanation of the above change is that the structural unit indicated in the following way where $8_n$ is a fairly large number, for instance, 10 to 20, decomposes and an oxyalkylated resin representing a lower degree of oxyethylation and a less soluble one, is generated and a cyclic polymer of ethylene oxide is produced, indicated thus:

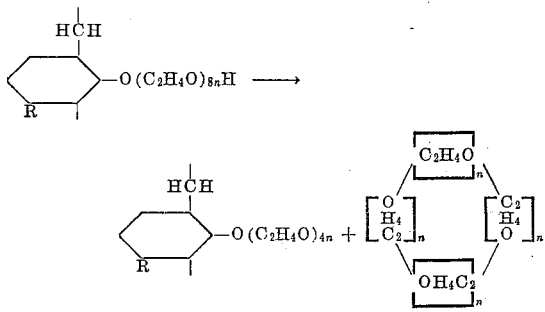

This fact, of course, presents no difficulty for the reason that oxyalkylation can be conducted in each instance stepwise, or at a gradual rate, and samples taken at short intervals so as to arrive at a point where optimum surface activity or hydrophile character is obtained if desired; for products for use in the practice of this invention, this is not necessary and, in fact, may be undesirable, i. e., reduce the efficiency of the product.

We do not know to what extent oxyalkylation produces uniform distribution in regard to phenolic hydroxyls present in the resin molecule. In some instances, of course, such distribution can not be uniform for the reason that we have not specified that the molecules of ethylene oxide, for example, be added in multiples of the units present in the resin molecule. This may be illustrated in the following manner:

Suppose the resin happens to have five phenolic nuclei. If a minimum of two moles of ethylene oxide per phenolic nucleus are added, this would mean an addition of 10 moles of ethylene oxide, but suppose that one added 11 moles of ethylene oxide, or 12, or 13, or 14 moles; obviously, even assuming the most uniform distribution possible, some of the polyethyleneoxy radicals would contain 3 ethyleneoxy units and some would contain 2. Therefore, it is impossible to specify uniform distribution in regard to the entrance of the ethylene oxide or other oxyalkylating agent. For that matter, if one were to introduce 25 moles of ethylene oxide there is no way to be certain that all chains would have 5 units; there might be some having, for example, 4 and 6 units, or for that matter 3 or 7 units. Nor is there any basis for assuming that the number of molecules of the oxyalkylating agent added to each of the molecules of the resin is the same, or different. Thus, where formulae are given to illustrate or depict the oxyalklated products, distributions of radicals indicated are to be statistically taken. We have, however, included specific directions and specifications in regard to the total amount of ethylene oxide, or total amount of any other oxyalkylating agent, to add.

In regard to solubility of the resins and the oxyalkylated compounds, and for that matter derivatives of the latter, the following should be noted. In oxyalkylation, any solvent employed should be non-reactive to the alkylene oxide employed. This limitation does not apply to solvents used in cryoscopic determinations for obvious reasons. Attention is directed to the fact that various organic solvents may be employed to verify that the resin is organic solvent-soluble. Such solubility test merely characterizes the resin. The particular solvent used in such test may not be suitable for a molecular weight determination and, likewise, the solvent used in determining molecular weight may not be suitable as a solvent during oxyalkylation. For solution of the oxyalkylated compounds, or their derivatives, a great variety of solvents may be employed, such as alcohols, ether alcohols, cresols, phenols, ketones, esters, etc., alone or with the addition of water. Some of these are mentioned hereafter. We prefer the use of benzene or diphenylamine as a solvent in making cryoscopic measurements. The most satisfactory resins are those which are soluble in xylene or the like, rather than those which are soluble only in some other solvent containing elements other than carbon and hydrogen, for instance, oxygen or chlorine. Such solvents are usually polar, semi-polar, or slightly polar in nature compared with xylene, cymene, etc.

Reference to cryoscopic measurement is concerned with the use of benzene or other suitable compound as a solvent. Such method will show that conventional resins obtained, for example, from para-tertiary amylphenol and formaldehyde in presence of an acid catalyst, will have a molecular weight indicating 3, 4, 5 or somewhat greater number of structural units per molecule. If more drastic conditions of resinification are employed or if such low-stage resin is subjected to a vacuum distillation treatment as previously described, one obtains a resin of a distinctly higher molecular weight. Any molecular weight determination used, whether cryoscopic measurement or otherwise, other than the conventional cryoscopic one employing benzene, should be checked so as to insure that it gives consistent values on such conventional resins as a control. Frequently all that is necessary to make an approximation of the molecular weight range is to make a comparison with the dimer obtained by chemical combination of two moles of the same phenol, and one mole of the same aldehyde under conditions to insure dimerization. As to the preparation of dimers from substituted phenols, see Carswell, "Phenoplasts," page 31. The increased viscosity, resinous character, and decreased solubility, etc., of the higher polymers in comparison with the dimer, frequently are all that is required to establish that the resin contains 3 or more structural units per molecule.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or subsurface or surface-active. Such resins, in turn, are oxyalkylation-susceptible, water-insoluble, organic solvent-soluble, fusible, phenol-aldehyde resins, derived from difunctional phenols having a 2,4,6 hydrocarbon substituent with 4 to 8 carbon atoms. Based on actual large scale application in a large number of oil fields in the United States and certain foreign countries, we believe that this type of material, the oxyalkylated products of fusible solvent-soluble resins, particularly phenol-aldehyde resins, either as such or in the form of derivatives, ultimately will be employed in no less than 50% of all chemical demulsifying agents used throughout the world.

We have employed oxylkylated cardanol resins of the kind herein described and in numerous instances have resolved the emulsions, using 25 parts per million, or less, of the demulsifying agent. In actual commercial use, of course, the use of cardanol resins depends on whether or not phenol is obtained as economically or more economically than some other competitive phenol, such as para-amylphenol, para-butylphenol, etc.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1b, with 15 parts by weight, of xylene and 10 parts, by weight, of isopropyl alcohol, an excellent demulsifier is obtained. Selection of the solvent will vary, depending upon the solubility characteristics of the oxyalkylated product, and, of course, will be dictated, in part, by economic considerations, i. e., cost.

As noted above, the products herein described may be used not only in diluted form, but also may be used admixed with some other demulsifying agent, for example, one may employ a mixture such as the following:

Oxyalkylated derivative, for example, the product of Example 1b, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of oxyalkylated resinous compounds or derivatives thereof for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative, rather than the resin itself. As an example of such procedure, reference is made to our co-pending applications Serial Nos. 726,201 and 726,204, all filed February 3, 1947 both now abandoned.

In the herein described phenolic mixtures of an anacardic acid phenol and a difunctional phenol, such mixtures could advantageously contain at least one mole in 10 of each type of phenol specified.

Having thus described our invention, what we claim as new and desire to secure by Letters Patent, is

1. A process for breaking petroleum emulsions of the water-in-oil type characterized by subjecting the emulsion to the action of a demulsifying agent including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a reactant consisting of a mixture of an anacardic acid phenol and a difunctional phenol on the one hand, and on the other hand an aldehyde having not over 8 carbon atoms and reactive toward said phenolic reactant; the proportions of anacardic acid phenol and difunctional phenol being such that there is present at least one nucleus from each for each resin molecule, said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxy propylene radicals, and $n$ is a numeral varying from 1 to 20, with the proviso that at least 2 moles of alkylene oxide be introduced for each phenolic nucleus; said anacardic phenolic constituent being derived from the class consisting of an anacardic acid phenol and a side chain chlorinated and a side chain hydrogenated derivative thereof.

2. A process for breaking petroleum emulsions of the water-in-oil type characterized by subjecting the emulsion to the action of a demulsifying agent including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin;

said resin being derived by reaction between a reactant consisting of a mixture of an anacardic acid phenol and a difunctional phenol on the one hand, and on the other hand an aldehyde having not over 8 carbon atoms and reactive toward said phenolic reactant; the proportions of anacardic acid phenol and difunctional phenol being such that there is present at least one nucleus from each for each resin molecule, said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxy propylene radicals, and $n$ is a numeral varying from 1 to 20; with the proviso that at least 2 moles of alkylene oxide be introduced for each phenolic nucleus; said anacardic phenolic constituent being derived from the class consisting of an anacardic acid phenol and a side chain chlorinated and a side chain hydrogenated derivative thereof; and with the final proviso that the hydrophile properties of said oxyalkylated resin in an equal weight of xylene are sufficient to produce an emulsion when said xylene solution is shaken vigorously with one to three volumes of water.

3. A process for breaking petroleum emulsions of the water-in-oil type characterized by subjecting the emulsion to the action of a demulsifying agent including hydrophile synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a reactant consisting of a mixture of an anacardic acid phenol and a difunctional phenol on the one hand, and on the other hand an aldehyde having not over 8 carbon atoms and reactive toward said phenolic reactant; the proportions of anacardic acid phenol and difunctional phenol being such that there is present at least one nucleus from each for each resin molecule, said oxyethylated resin being characterized by the introduction into the resin molecule of a plurality of divalent radicals having the formula $(C_2H_4O)_n$, wherein $n$ is a numeral varying from 1 to 20; with the proviso that at least 2 moles of alkylene oxide be introduced for each phenolic nucleus; said anacardic phenolic constituent being derived from the class consisting of an anacardic acid phenol and a side chain chlorinated and a side chain hydrogenated derivative thereof; and with the final proviso that the hydrophile properties of said oxyethylated resin in an equal weight of xylene are sufficient to produce an emulsion when said xylene solution is shaken vigorously with one to three volumes of water.

4. A process for breaking petroleum emulsions of the water-in-oil type characterized by subjecting the emulsion to the action of a demulsifying agent including hydrophile synthetic products; said hydrophile synthetic products being oxyethylation products of (A) ethylene oxide, and (B) an oxyethylation-susceptible, fusible, organic solvent-soluble, water-insoluble, low-stage, phenol-aldehyde resin having an average molecular weight corresponding to at least 3 and not over 7 phenolic nuclei per resin molecule; said resin being derived by reaction between a reactant consisting of a mixture of an anacardic acid phenol and a difunctional phenol on the one hand, and on the other hand an aldehyde having not over 8 carbon atoms and reactive toward said phenolic reactant; the proportions of anacardic acid phenol and difunctional phenol being such that there is present at least one nucleus from each for each resin molecule, said oxyethylated resin being characterized by the introduction into the resin molecule of a plurality of divalent radicals having the formula $(C_2H_4O)_n$, wherein $n$ is a numeral varying from 1 to 20; with the proviso that at least 2 moles of alkylene oxide be introduced for each phenolic nucleus; said anacardic phenolic constituent being derived from the class consisting of an anacardic acid phenol and a side chain chlorinated and a side chain hydrogenated derivative thereof; and with the final proviso that the hydrophile properties of said oxyethylated resin in an equal weight of xylene are sufficient to produce an emulsion when said xylene solution is shaken vigorously with one to three volumes of water.

5. The process of claim 4 wherein the aldehyde is an aliphatic aldehyde.

6. The process of claim 4 wherein the aldehyde is formaldehyde.

7. A process for breaking petroleum emulsions of the water-in-oil type characterized by subjecting the emulsion to the action of a demulsifying agent including hydrophile synthetic products; said hydrophile synthetic products being oxyethylation products of (A) ethylene oxide, and (B) an oxyethylation-susceptible, fusible, organic solvent-soluble, water-insoluble, low-stage, acid-catalyzed phenol-formaldehyde resin having an average molecular weight corresponding to at least 3 and not over 7 phenolic nuclei per resin molecule; said resin being derived by reaction between a reactant consisting of a mixture of an anacardic acid phenol and a difunctional phenol on the one hand, and formaldehyde on the other hand; the proportions of anacardic acid phenol and difunctional phenol being such that there is present at least one nucleus from each for each resin molecule, said oxyethylated resin being characterized by the introduction into the resin molecule of a plurality of divalent radicals having the formula $(C_2H_4O)_n$, wherein $n$ is a numeral varying from 1 to 20; with the proviso that at least 2 moles of alkylene oxide be introduced for each phenolic nucleus; said anacardic phenolic constituent being derived from the class consisting of an anacardic acid phenol and a side chain chlorinated and a side chain hydrogenated derivative thereof; and with the final proviso that the hydrophile properties of said oxyethylated resin in an equal weight of xylene are sufficient to produce an emulsion when said xylene solution is shaken vigorously with one to three volumes of water.

8. The process of claim 7 wherein the difunctional phenol employed in admixture with the anacardic acid phenol has at least 4 carbon atoms and not over 12 carbon atoms in the side chain substituent.

9. The process of claim 7 wherein the anacardic acid phenolic reactant is cashew nutshell liquid and the difunctional phenol employed in admixture with the anacardic acid phenol has at least 4 carbon atoms and not over 12 carbon atoms in the side chain substituent.

10. The process of claim 7 wherein the anacardic acid phenolic reactant is side chain chlorinated cashew nutshell liquid and the difunctional phenol employed in admixture with the anacardic acid phenol has at least 4 carbon atoms and not over 12 carbon atoms in the side chain substituent.

11. The process of claim 7 wherein the anacardic acid phenolic reactant is side chain hydrogenated cashew nutshell liquid and the difunctional phenol employed in admixture with the anacardic acid phenol has at least 4 carbon atoms and not over 12 carbon atoms in the side chain substituent.

MELVIN DE GROOTE.
BERNHARD KEISER.

REFERENCES CITED

The following references are of record in the file of this patent:

UNITED STATES PATENTS

| Number | Name | Date |
|---|---|---|
| 2,076,624 | De Groote | Nov. 16, 1936 |
| 2,243,330 | De Groote et al. | May 27, 1941 |
| 2,307,058 | Moeller | Jan. 5, 1943 |
| 2,454,541 | Bick et al. | Nov. 23, 1948 |